US006944152B1

(12) United States Patent
Heil

(10) Patent No.: US 6,944,152 B1
(45) Date of Patent: Sep. 13, 2005

(54) DATA STORAGE ACCESS THROUGH SWITCHED FABRIC

(75) Inventor: Tom Heil, Fort Collins, CO (US)

(73) Assignee: LSI Logic Corporation, Milpitas, CA (US)

(*) Notice: Subject to any disclaimer, the term of this patent is extended or adjusted under 35 U.S.C. 154(b) by 775 days.

(21) Appl. No.: 09/643,210

(22) Filed: Aug. 22, 2000

(51) Int. Cl.[7] .............................................. H04L 12/28
(52) U.S. Cl. ........................ 370/360; 370/400; 709/203
(58) Field of Search ............................... 370/352, 355, 370/360, 366, 357, 400, 401; 709/203

(56) References Cited

U.S. PATENT DOCUMENTS

| 5,345,558 A | * | 9/1994 | Opher et al. ................. 709/236 |
| 5,774,660 A | * | 6/1998 | Brendel et al. .............. 709/201 |
| 5,822,524 A | * | 10/1998 | Chen et al. .................. 709/203 |
| 5,894,554 A | * | 4/1999 | Lowery et al. .............. 709/203 |
| 5,982,780 A | * | 11/1999 | Bohm et al. ................. 370/450 |
| 6,006,264 A | * | 12/1999 | Colby et al. ................. 709/226 |
| 6,029,062 A | * | 2/2000 | Hanson ....................... 455/408 |
| 6,145,024 A | * | 11/2000 | Maezawa et al. ............. 710/14 |
| 6,370,605 B1 | * | 4/2002 | Chong, Jr. .................... 710/33 |
| 6,400,730 B1 | * | 6/2002 | Latif et al. ................... 370/466 |
| 6,579,018 B1 | * | 6/2003 | Li et al. ........................ 398/4 |

* cited by examiner

Primary Examiner—Chau Nguyen
Assistant Examiner—Joshua Kading
(74) Attorney, Agent, or Firm—Cochran, Freund & Young LLC

(57) ABSTRACT

A switched fabric, instead of a shared bus, establishes a data transfer path between a host device and a storage device. The host device accesses data stored on the storage device, but with data transfer speed and bandwidth advantages of a switched fabric architecture over a shared bus architecture. The components of a switch in the switched fabric are integrated together in a single integrated circuit, so as to have about the same size and cost as the prior art shared bus architecture. Additional storage devices and/or host devices may be connected to the switch and data transfer paths established between any host device and any storage device, but not between two storage devices. Another switch may be connected between host and storage devices to form redundant data transfer paths therebetween.

2 Claims, 11 Drawing Sheets

DATA STORAGE ACCESS THROUGH SWITCHED FABRIC

FIELD OF THE INVENTION

This invention relates to data storage in a computer or computer network. More particularly, the present invention relates to the use of "switched fabric" techniques for accessing data storage devices, such as disk drives. A switched fabric is similar to a computer network and utilizes common network switch devices, but when used between a host and multiple storage devices according to the present invention, the switched fabric enables a higher data throughput for high capacity data storage solutions.

BACKGROUND OF THE INVENTION

Conventional storage devices include hard disks, floppy disks, tape cassettes, tape libraries, optical devices and other devices. Conventional storage systems may include one or two of such storage devices (e.g. hard disk drives) installed in a stand-alone personal computer (PC) up to multiple storage devices grouped together (e.g. groups of eight to ten hard drives) in multiple storage servers that are further linked together to form vast arrays of storage devices. Such vast arrays of storage devices are commonly linked together in a storage area network (SAN), a type of local area network (LAN) specifically dedicated to the task of accessing and transferring stored data. Within the PCs or the storage servers, however, the storage devices are linked to other peripheral devices or to the host processor by a shared bandwidth bus input/output (I/O) architecture.

Whether incorporated in a single PC or a vast array of storage devices of a SAN, data storage techniques and systems for computers constantly need faster, more reliable storage access capabilities. Fibre Channel, a serial data transfer architecture that uses optical fiber to connect devices, is one standard solution that has been developed for high-speed SANs. InfiniBand™ is another serial data transfer solution that is currently being developed, initially for SANs, but eventually for other network situations, too. Within the PCs or the storage servers, shared bus architectures, such as a PCI (Peripheral Component Interconnect) bus, have been developed for high-speed internal communication. The PCI bus commonly connects to other shared bus architectures, such as a Small Computer System Interface (SCSI) bus or a Fibre Channel Arbitrated Loop (FAL), which connect to the storage devices.

Shared bus architectures utilize the same communication speeds, bandwidths and protocols for each device to which the shared bus is connected. Thus, when the shared bus is upgraded to a faster communication speed or greater bandwidth or different protocol, or when the computer industry migrates to a different shared bus architecture, every device that connects to the shared bus must be redesigned with a new interface for the new communication speeds, bandwidths, protocols or architecture. Therefore, such changes are difficult to implement, since many different manufacturers of many different devices have to coordinate redesign of their devices at about the same time, so that integrators of the devices and users of the devices have a full range of devices that can be used with the new communication speeds, bandwidths, protocols or architecture.

With regard to SANs, an example of a simple SAN topology is a point-to-point architecture between two devices, such as a storage server and a storage host device, wherein the storage server maintains the stored data, and the storage host device accesses the stored data from the storage server and furnishes the stored data to a variety of client devices, such as PCs. More complex SAN topologies, such as arbitrated loop and switched fabric architectures, typically have a "ring" or "star" configuration, respectively. In an arbitrated loop, each device is linked to the next, with the last linked back to the first, in a continuous loop, or ring, configuration. Switched fabric, on the other hand, has the "star" configuration, which resembles a multi-pointed star having one or more switches in the center and a variety of nodes connecting to devices at the points.

A typical switched fabric network 20 is illustrated in FIG. 1. In the star topology, several network devices 22 are each hooked directly to one or more switches 24. The network devices 22 are typically any type of device that can be networked together, such as a host device, a client device, an application server, a personal computer, a mainframe computer, another switch, a network router, a network hub, a network repeater, etc. The switch 24 can establish data transfer paths between any two of the network devices 22, as illustrated by the bidirectional arrows 26.

The switch(es) 24 connecting the network devices 22 is/are called the "fabric" or "switched fabric." Optical fibers (e.g. Fibre Channel) or wires (e.g. InfiniBand) from any switch 24 in the fabric may attach to a node port (e.g. storage server or storage host device) or to a port of the fabric (e.g. a port of another switch). Fibre Channel is commonly used in each of the above described types of SAN topologies (i.e. point-to-point, ring and star). However, direct connections to storage devices have been specified only for the arbitrated loop architecture; whereas, the switched fabric architecture has been specified for connecting the storage servers and other devices into which the storage devices are installed, but not for connecting the storage devices, themselves. InfiniBand, on the other hand, is being developed primarily for switched fabric star topologies for connecting the storage servers and other devices into which the storage devices are installed.

Initially, InfiniBand technology, like Fibre Channel, will be used to make external connections between storage servers and remote storage and networking devices, as well as with other servers, in a storage area network (SAN), including for inter-processor communication (IPC) in parallel clusters. In addition to making external connections, however, InfiniBand technology will also eventually be used to make internal connections within the storage server to replace connections by the shared bus (e.g. the PCI bus) to standard SCSI or FAL interfaces. However, each of the devices (e.g. processors and I/O interfaces) that uses the shared bus must wait for its turn to gain control over the shared bus. Thus, there are bandwidth, latency and "bottleneck" issues involved with shared bus architectures, wherein the shared bus may be the limiting factor in the performance of the overall system. In a switched fabric, however, individual data transfer paths may be opened between any two of the devices for rapid communication of messages therebetween, with multiple data transfer paths in existence concurrently. Further benefits of a switched fabric, particularly InfiniBand, over a shared bus include small form factors, greater performance, lower latency, easier and faster sharing of data, built-in security and quality of service, and improved usability.

It is with respect to these and other background considerations that the present invention has evolved.

SUMMARY OF THE INVENTION

The present invention utilizes a switched fabric architecture, such as Fibre Channel or InfiniBand, rather than a shared bus architecture, such as SCSI or FAL in combination with PCI, to access local storage devices, such as hard drives. In this manner, the storage device(s) and host processor(s), within a personal computer (PC) or storage server or other data processing device, do not have to arbitrate for control of the shared bus(es) and then wait for their turn to transmit data across the shared bus. Instead, each storage device and the host processor sends message packets through an internal switch (the switched fabric), which forwards the message packets to the intended recipient. The initiator (the storage device or host processor) of a message packet establishes a data transfer path through the switched fabric to the recipient in much the same way that networked devices (host devices, storage servers, client devices, etc.) in a storage area network (SAN) communicate with each other through external switches, routers, hubs and other networking devices of the SAN. Such a data transfer path can be established between a storage device and another component inside the data processing device generally simultaneously with another data transfer path(s) through the switched fabric. Thus, the invention has the bandwidth and speed benefits of switched fabrics compared to that of shared buses.

The invention also has easy upgrading and scaling benefits not available with shared bus architectures, because the connections to the switched fabric do not all have to be alike. Instead, the switched fabric includes different types of connections. Thus, different combinations of host devices, switched fabric and storage devices may be made. Any number or type of host devices and storage devices may connect the switched fabric for each of the host devices to be able to access each of the storage devices. Upgrades to or replacements of host and/or storage devices may be made without having to change other devices. Likewise, the switched fabric, itself, may include one or more switches in a variety of combinations, which can be upgraded or replaced without having to change the host devices or storage devices.

Additionally, the invention avoids cost and size disadvantages of conventional switched fabrics because of current advances in semiconductor fabrication that enable the integration of large numbers of components into a single integrated circuit (IC) chip (a.k.a. "system on a chip"). In this manner, the physical space required by the invention inside the typical housing of the data processing device is about the same as that required for a shared bus. With several of the switch components integrated in a single IC chip, the overall cost is about the same as that for a shared bus.

The invention also enables certain simplifications from conventional switched fabrics. For example, in a storage server, the various storage devices typically do not need to communicate with each other, so it is preferable that the switch not support the ability to establish communication channels directly between those ports that interconnect between storage devices, thereby simplifying some of the required circuitry in the switch. Additionally, since the storage devices generally need to communicate with the host processor(s) at about the same time to satisfy simultaneous storage access requests, the ports that connect to the storage devices preferably have a lower data transfer speed than the ports that connect to the host processor(s). In other words, the ports that connect to the storage devices may have reduced functionality compared to the ports that connect to the host processor. Also, since the storage devices typically communicate with the host processor at about the same time, and since the port that connects to the host processor is faster than the other ports, each port is typically utilized to about its maximum bandwidth, or data transfer potential. In this manner, overall efficiency of the switched fabric is maximized.

These and other improvements are achieved in a storage network having a host device that accesses stored data in a plurality of storage devices. The storage network comprises a switched fabric that has a switch, a host-side link, a plurality of storage-side links and a switch matrix. The host-side link connects the switch to the host device and includes a host-side interface between the switch and the host device. The storage-side links connect the switch to the plurality of storage devices. Each storage-side link includes a storage-side interface between the switch and the storage devices. The host-side and storage-side interfaces send and receive data to and from the host device and the storage devices, respectively. The switch matrix connects to the host-side and storage-side links and establishes communication channels therebetween for transferring message packets including the data between the host device and any of the storage devices.

The storage network preferably further comprises a second host device connected to the switch at a second host-side link, similar to the first host-side link. Thus, the switch matrix can establish communication channels from either host device to any of the storage devices for transferring data therebetween. The data transfers may even be performed simultaneously. Additionally, the switched fabric preferably further comprises a second switch, similar to the first switch, connected to all of the host device(s) and the storage devices, so the host device(s) can access the stored data through either switch to the storage devices. In another alternative, each storage device preferably connects to two of the storage-side links, either in the same switch or in two different switches, so that the host device can access the storage device through either storage-side link. Such redundancy, either in the number of switches or the number of links to the storage devices, assures that the stored data will be accessible by the host device and increases data throughput.

The previously mentioned and other improvements are also achieved in a method of communicating data between a host device and a storage device through a switched fabric. In the method, the host device sends a data access request to the switched fabric. The data access request is directed to a selected one of a plurality of the storage devices, which are connected to the switched fabric. A data transfer path is established between the host device and the selected storage device through the switched fabric. The data access request is sent from the switched fabric to the selected storage device. The host device and the selected storage device transfer data between themselves through the established data transfer path in the switched fabric.

The host device preferably sends a second data access request to the switched fabric, but directed to a second selected storage device. Therefore, a data transfer path is established between the host device and the second selected storage device through the switched fabric, and data transfers can occur between the switched fabric and both of the selected storage devices at the same time. Alternatively, the first data access request is preferably sent through a first switch and the second data access request is sent through a second switch. The first and second switches form the switched fabric. The data transfer paths are established through their respective switch, so the data can be transferred between the host device and both of the selected storage devices at the same time. In another alternative, it is preferable that two different host devices send two different data access requests through the switched fabric to two different storage devices. Thus, two data transfer paths are established through the switched fabric, and the resulting two data transfers can occur at the same time.

It is further preferable that the method of accessing data be performed in combination with managing a storage network, wherein the storage network is defined by the host device, the switched fabric and the storage devices. In this alternative, the host device, the switched fabric and the storage devices are monitored to detect for a capacity saturation condition in which one or more of these components of the storage network cannot handle additional data transfer capacity. The saturated component is then modified for greater data transfer capacity.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

DETAILED DESCRIPTION

Figure 2:
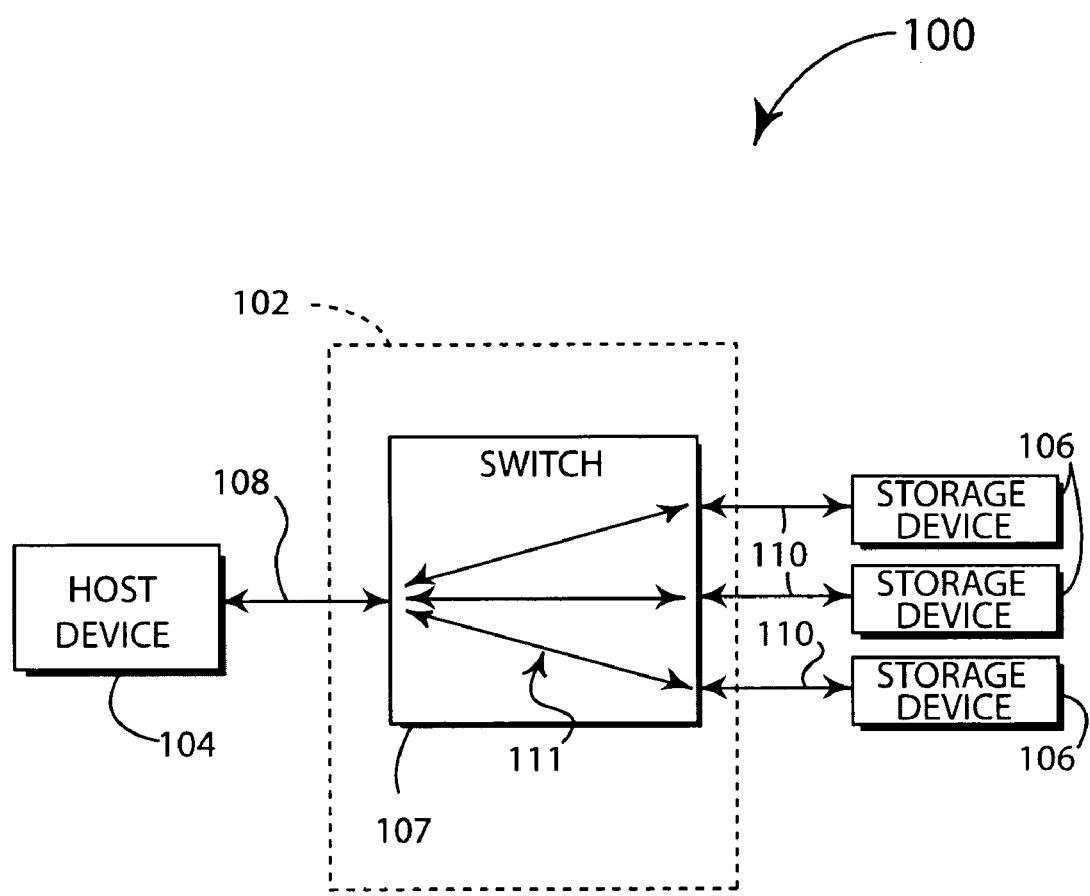
FIG. 2 is a block diagram of a simplified switched fabric network incorporating the present invention.
Figure 3:
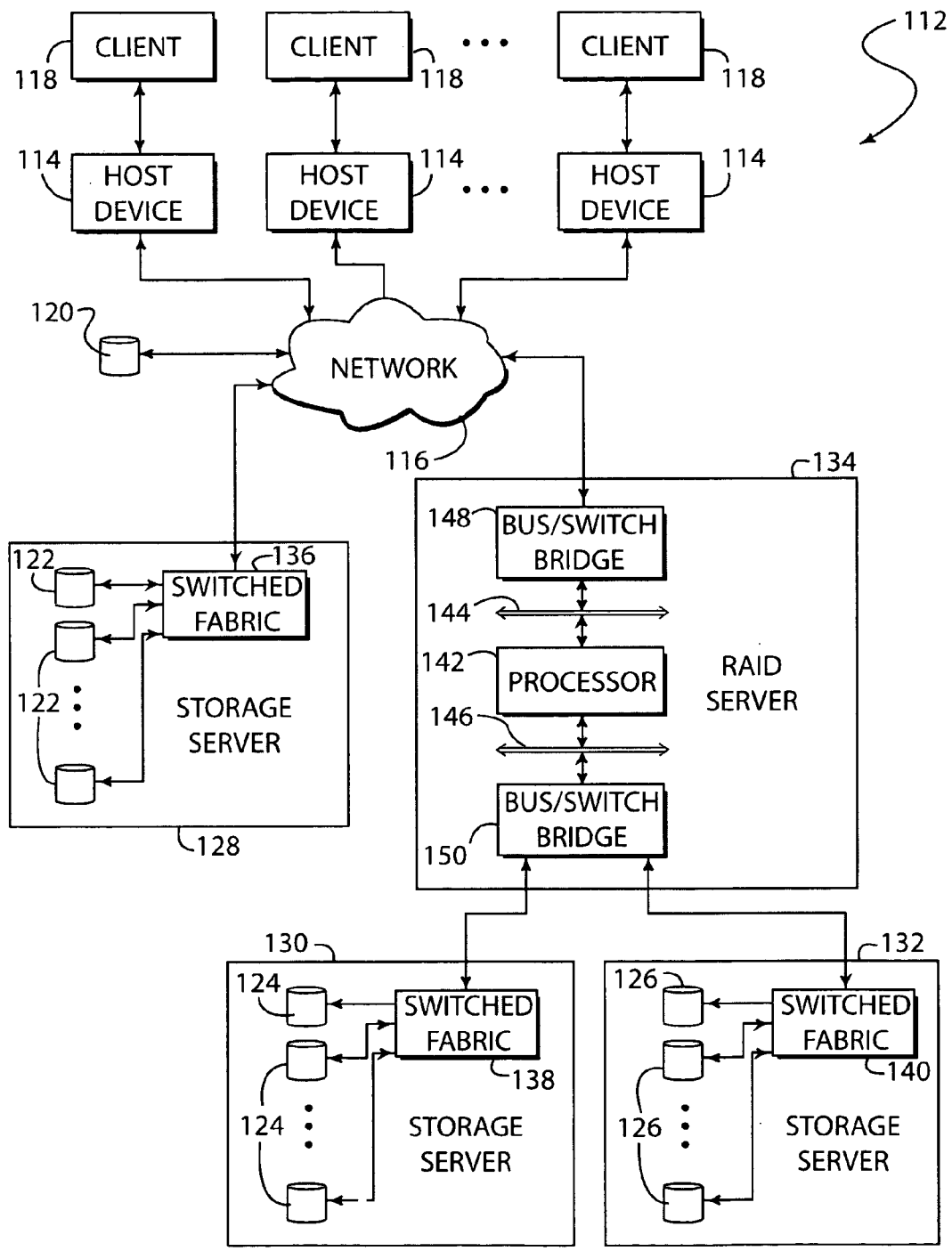
FIG. 3 is a block diagram of another embodiment of a switched fabric network incorporating the present invention.
Figure 4:
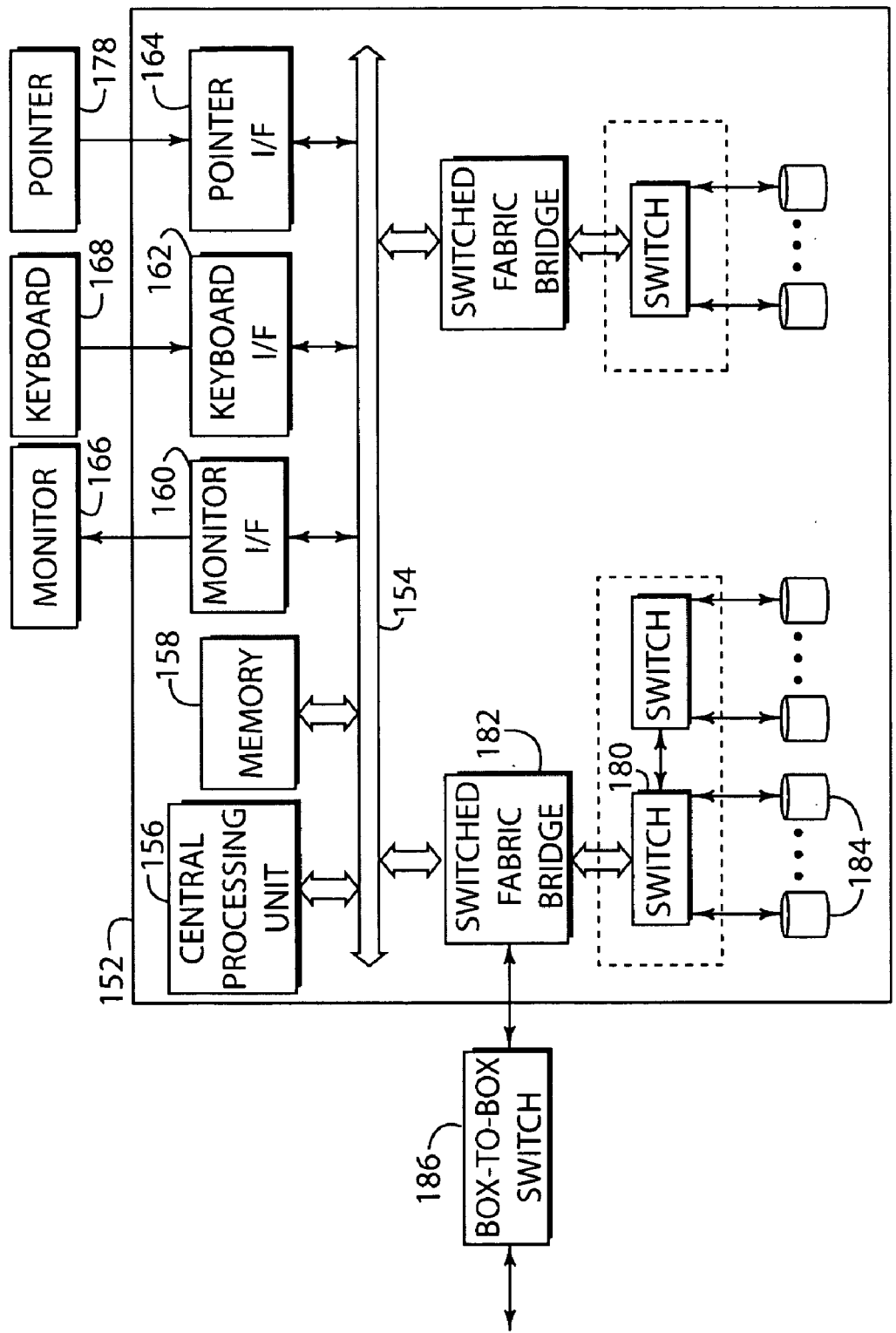
FIG. 4 is a block diagram of another embodiment of a switched fabric network incorporating the present invention entirely within an individual data processing device.

A switched fabric network 100 incorporating the present invention generally includes a switched fabric 102, one or more host devices 104 and a plurality of storage devices 106, as shown in FIG. 2. The switched fabric 102 typically includes one or more switches 107 that connect the host device 104 to the storage devices 106. The host device 104 connects to the switched fabric 102 through a conventional communication path 108. The storage devices 106 connect to the switched fabric 102 through conventional communication paths 110. The communication paths 108 and 110 are preferably conventional serial communication links. The switched fabric network 100 may be all or part of a local area network (LAN), wide area network (WAN) or storage area network (SAN) (as shown in FIG. 3) or may be part of the internal architecture of an individual data processing device (as shown in FIG. 4). The storage devices 106 are any type of storage devices, such as hard drives, but may be interfaces to other types of devices, such as a bridge to a SCSI (Small Computer System Interface) bus, a bridge to a Fibre Channel SAN, a bridge to an Ethernet network, etc. The host device 104 is preferably a computer server (in a SAN) or a host processor (in an individual data processing device).

The switch 107 is similar in function to conventional network switch devices (24, FIG. 1) used to enable computers to communicate in a conventional network. The switch 107 establishes communication channels for the transfer of message packets containing data or data access requests between the host device 104 and the storage devices 106. However, the storage devices 106 typically do not have to communicate with each other, but communicate only with the host device 104. Thus, the switch 107 can establish data transfer paths (as illustrated by the bidirectional arrows 111) between the host device 104 and any of the storage devices 106, but not between two storage devices 106. In other words, the switch 107 is unlike typical switches, which can establish data transfer paths between any two attached devices.

Additionally, each of the storage devices 106 must be able to communicate with the host device 104 at about the same time, so the host-side communication path 108 is the limiting factor in the overall data transfer speed of the switched fabric 102. Thus, it is advantageous to implement the switch 107 as an "edge switch." An edge switch is a conventional concept and has a relatively high data transfer speed for one or two connections (e.g. the host-side communication path 108) and a relatively lower data transfer speed for the other connections (e.g. the storage-side communication paths 110). In this manner, the usage of each of the communication paths 108 and 110 can be optimized, because the host-side communication path 108 is preferably fast enough to transfer message packets in and out of the switched fabric 102 at about the same rate that all of the storage-side communication paths 110 combined can transfer message packets in and out of the switched fabric 102.

In an individual data processing device, such as a server or personal computer, the switch 107 or switched fabric 102 replaces, and performs the general function of, a conventional shared bus architecture, such as a PCI (Peripheral Component Interconnect) bus in combination with a SCSI (Small Computer System Interface) bus and/or a FAL (Fibre Channel Arbitrated Loop), for accessing storage devices and other peripheral devices. The switched fabric 102 performs this function with less latency, greater overall bandwidth and greater scalability, as described below, than does a shared bus. Such storage devices and other peripheral devices correspond to the storage devices 106. To have about the same size and cost as the components for a shared bus, the components of the switch 107 are integrated together in a single integrated circuit (not shown). Advances in miniaturization and scaling have led to the integration of complete systems on a single integrated circuit (a.k.a. "system on a chip"), so the size and cost of the switched fabric 102 is competitive with, or comparable to, the shared bus architecture.

The host device 104 typically initiates a data access request for a selected storage device 106 by issuing a message packet that is directed to the selected storage device 106 through the switched fabric 102. The switched fabric 102 receives the message packet and determines therefrom the selected storage device 106 to which the message packet is directed. The switched fabric 102 establishes a data transfer path between the host device 104 and the selected storage device 106 and passes the message packet to the selected storage device 106. Thereafter, the host device 104 and the selected storage device 106 transfer additional message packets containing data back and forth as necessary through the data transfer path.

Since the host-side communication path 108 preferably has a greater bandwidth than each of the storage-side communication paths 110, the host device 104 may issue message packets directed to one or more other selected storage devices before competing the data access initiated by the first message packet. The switched fabric 102 then establishes a data transfer path between the host device 104 and the other selected storage devices 106. The switched fabric 102 can handle data transfers with the communication paths 110 for all of the selected storage devices 106 simultaneously, but the switched fabric 102 multiplexes between the data transfers through the communication path 108 to the host device 104 for each of the established data transfer paths.

An exemplary SAN 112 is shown in FIG. 3, wherein one or more conventional host devices 114 access stored data through a network 116. In this case, the network 116 preferably includes various conventional switches, routers, hubs and/or other networking devices (not shown) as required. The host devices 114 access the stored data according to storage access requests issued by various conventional client devices 118, such as PCs.

The stored data is stored in storage devices 120, 122, 124 and 126. Three types of storage access techniques are depicted with the storage devices 120, 122, 124 and 126. The storage device 120 is connected directly to the network 116 in a manner similar to that of connecting conventional Fibre Channel disk drives directly to a conventional Fibre Channel arbitrated loop. The storage devices 122, on the other hand, are contained in a storage server 128, which is connected directly to the network 116. The storage devices 124 and 126 are also contained in storage servers 130 and 132, respectively, however, the storage servers 130 and 132 connect to a RAID (Redundant Array of Independent Drives) server 134, which connects to the network 116.

The storage servers 128, 130 and 132 each incorporate a switched fabric 136, 138 and 140, respectively, connected to the storage devices 122, 124 and 126, respectively. The switched fabrics 136, 138 and 140 are similar to the switched fabric 102 (FIG. 2) and handle channel switching for storage access requests to the storage devices 122, 124 and 126, respectively. The host devices 114 access the stored data in the storage devices 122, 124 and 126 through the switched fabrics 136, 138 and 140, respectively, and the RAID server 134 (for storage devices 124 and 126). In this case, the host devices 114 are similar to the host device 104 (FIG. 2), except that the host devices 114 are physically separated from the switched fabrics 136, 138 and 140.

The RAID server 134 includes a conventional processor 142 and shared buses 144 and 146, such as PCI buses. The RAID server 134 also includes a shared-bus-to-switched-fabric bridge 148 to link the shared bus 144 to the network 116 and another shared-bus-to-switched-fabric bridge 150 to link the shared bus 146 to the switched fabrics 138 and 140 of the storage servers 130 and 132, respectively.

An example of a data processing device 152, such as a PC or storage server, which incorporates the present invention, is shown in FIG. 4. The data processing device 152 generally includes a shared bus 154, such as a proprietary host bus, to which the various conventional components of the data processing device 152 are connected. For example, one or more conventional central processing units 156 are connected to the shared bus 154 and execute various applications. A conventional main memory RAM 158 is connected to the shared bus 154 and stores applications and data to be executed or used by the central processing unit 156. A conventional monitor interface 160, a conventional keyboard Interface 162 and a conventional pointer interface 154 connect to the shared bus 154 and to a conventional monitor 166, a conventional keyboard 168 and a conventional pointer device 170, respectively, in order to provide input and output for a user of the data processing device 152.

The data processing device 152 also includes a switch 180 and a switched fabric bridge 182 to connect the switch 180 to the shared bus 154. The switch 180 handles storage access requests to a plurality of storage devices 184 and establishes individual data transfer paths from each of the storage devices 184 through the switched fabric bridge 182 to the shared bus 154 and subsequently to the host central processing unit 156. In this manner, the switch 180 defines the switched fabric 102 (FIG. 2), and the entire data processing device 152 defines the switched fabric network 100 (FIG. 2). The central processing unit 156, which defines the host device 104 (FIG. 2) in this case, is physically separated from the switch 180 by the shared bus 154 and the switched fabric bridge 182.

The data processing device 152 is optionally connected to a conventional box-to-box switch 186 through the switched fabric bridge 182. A box-to-box switch typically connects two devices, such as the data processing device 152 and an external switched fabric (not shown) or other device (not shown). For example, though not shown in FIG. 3, the storage server 128 (FIG. 3) is preferably connected to the network 116 (FIG. 3) by such a box-to-box switch. Likewise, the storage servers 130 and 132 (FIG. 3) are preferably connected to the RAID server 134 in a similar manner.

Figure 5:
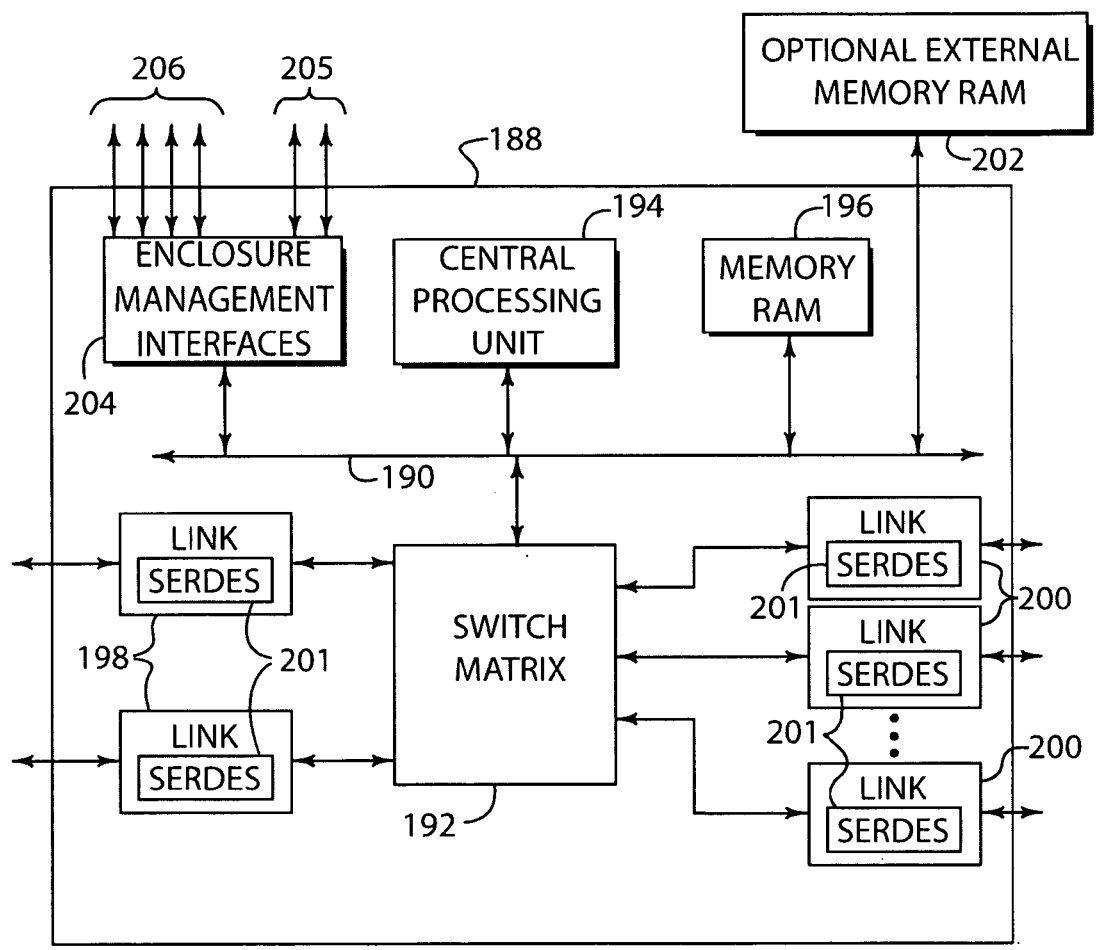
FIG. 5 is a block diagram of a switch incorporated in the switched fabric networks shown in FIGS. 2, 3 and 4.

An exemplary switch 188, as shown in a block diagram in FIG. 5, may be used for the switched fabrics 136, 138, 140 (FIG. 3) and the switch 180 (FIG. 4). The switch 188 preferably includes an internal shared bus 190 that connects the main components of the switch 188. The switch 188 is also preferably a single integrated circuit (IC) chip in the manner of a "system on a chip." The main components of the switch 188 generally include a switch matrix 192, an embedded central processing unit 194 and an embedded memory RAM 196 connected together through the internal shared bus 190. The embedded central processing unit 194 generally controls the functions of the switch 188 through the internal shared bus 190. The memory RAM 196 stores programs and data executed and used by the central processing unit 194 to control the switch 188.

The switch matrix 192 generally performs the switching functions for establishing communication channels through the switch 188. One or more host-side links 198 connect the switch matrix 192 to the switched fabric bridge 182 (FIG. 4) or the host device 104 (FIG. 2). A plurality of storage-side links 200 connect the switch matrix 192 to the storage devices 184 (FIG. 4) or the storage devices 106 (FIG. 2). With a plurality of the host-side links 198, the switch 188 can support a plurality of host devices 104, each of which can access any of the storage devices 106.

Each link 198 and 200 includes a conventional interface, such as a serializer/deserializer (SERDES) 201, for transferring data between the switch matrix 192 and external devices, such as the host device 104 (FIG. 2) and the storage devices 106 (FIG. 2). The serializer/deserializer 201 serializes parallel data into serial data sent out of the switch 188 and deserializes serial data into parallel data received into the switch 188.

The links 198 and 200 and the serializer/deserializers 201 preferably have asymmetrical data transfer rates. In particular, the host-side links 198 are preferably higher speed links than the storage-side links 200. For example, the host-side links 198 are preferably 4 or 12-lane InfiniBand, host ports, and the storage-side links 200 are preferably one-lane InfiniBand device ports. Alternatively, the host-side links 198 are preferably 266-Mbit/s, 530-Mbit/s, or 1-Gbit/s Fibre Channel host ports, and the storage-side links 200 are preferably 133-Mbit/s Fibre Channel device ports. In other words, the host-side links 198 connected to one or more host devices 104 (FIG. 2) carry more data than the storage-side links 200 connected to the storage devices 106 (FIG. 2). Thus, the switch matrix 192 can send or receive data through one host-side link 198 at about the same rate that it receives or sends data through two or more storage-side links 200. In this manner, both types of links 198 and 200 are utilized to near optimum capacity.

The asymmetry in the data transfer rates is primarily due to the fact that there are typically more storage devices 106 (FIG. 2) than there are host devices 104 (FIG. 2), and thus, more storage-side links 200 than host-side links 198. Additionally, the storage devices 106, particularly in the case of storage devices 122, 124, 126 (FIG. 3) and 184 (FIG. 4), typically do not communicate with other storage devices 106, but rather, communicate primarily with the host device 104. Thus, in order to utilize each of the links 198 and 200 to their optimum capacity, it is advantageous for the host-side links 198 to have a higher speed or bandwidth than the storage-side links 200. This asymmetry is also known as a conventional "edge switch" concept. Additionally, since the storage devices 122, 124, 126 and 184 do not communicate with each other (i.e. the switch matrix 192 does not establish a communication channel between these devices), the switch 188 is simpler than a conventional type of switched fabric that enables data transfer paths between any two devices connected to any two ports of the switched fabric.

The switch 188 may also be attached to an optional external memory RAM 202 in place of, or in addition to, the embedded memory RAM 196. The external memory RAM 202 is connected to the internal shared bus 190 and stores applications utilized by the embedded central processing unit 194 to control the functioning of the switch 188.

Figure 1:
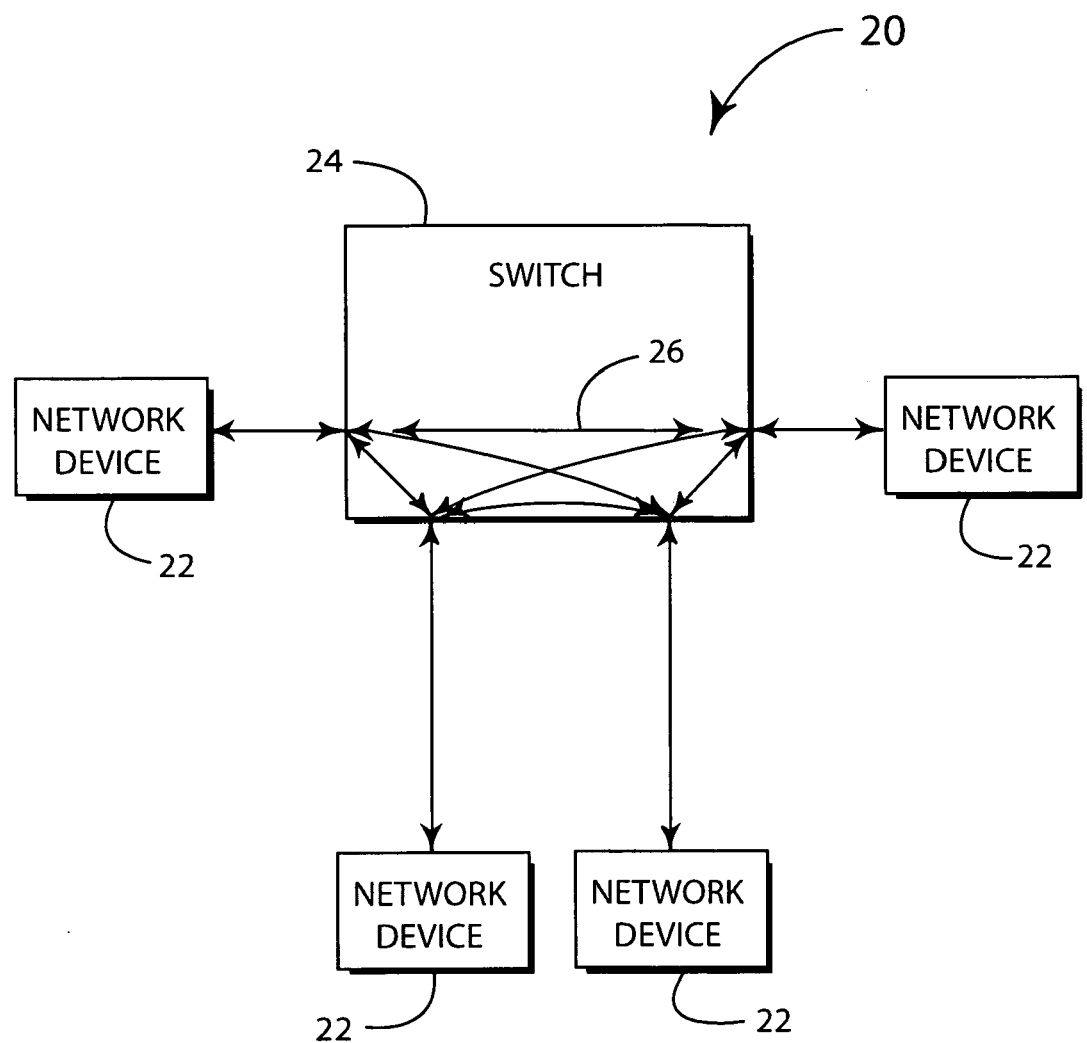
FIG. 1 is a block diagram of a prior art switched fabric network.

FIG. 5 also shows a typical enclosure management interface 204 with conventional I²C ports 205 and/or general purpose I/O lines 206. The enclosure management interface 204 is connected to the internal shared bus 190 to communicate with the embedded central processing unit 194. The enclosure management interface 204 functions under commands from the embedded central processing unit 194, which is configured by instructions sent by a control application (not shown) running in the switched fabric network 100 (FIG. 1). The instructions from the control application are sent through a virtual channel through the host-side links 198, the switch matrix 192 and the internal shared bus 190 to the embedded central processing unit 194. The enclosure management interface 204 primarily sends data received through the I²C ports 205 and/or general purpose I/O lines 206 to the embedded central processing unit 194 regarding the condition of the switch 188, such as the temperature of the switch 188. The enclosure management interface 204 may also toggle external LED (light emitting diode, not shown) indicators associated with the switch 188 or query a serial ROM (read only memory, not shown) to obtain the serial number of the switch 188.

Figure 6:
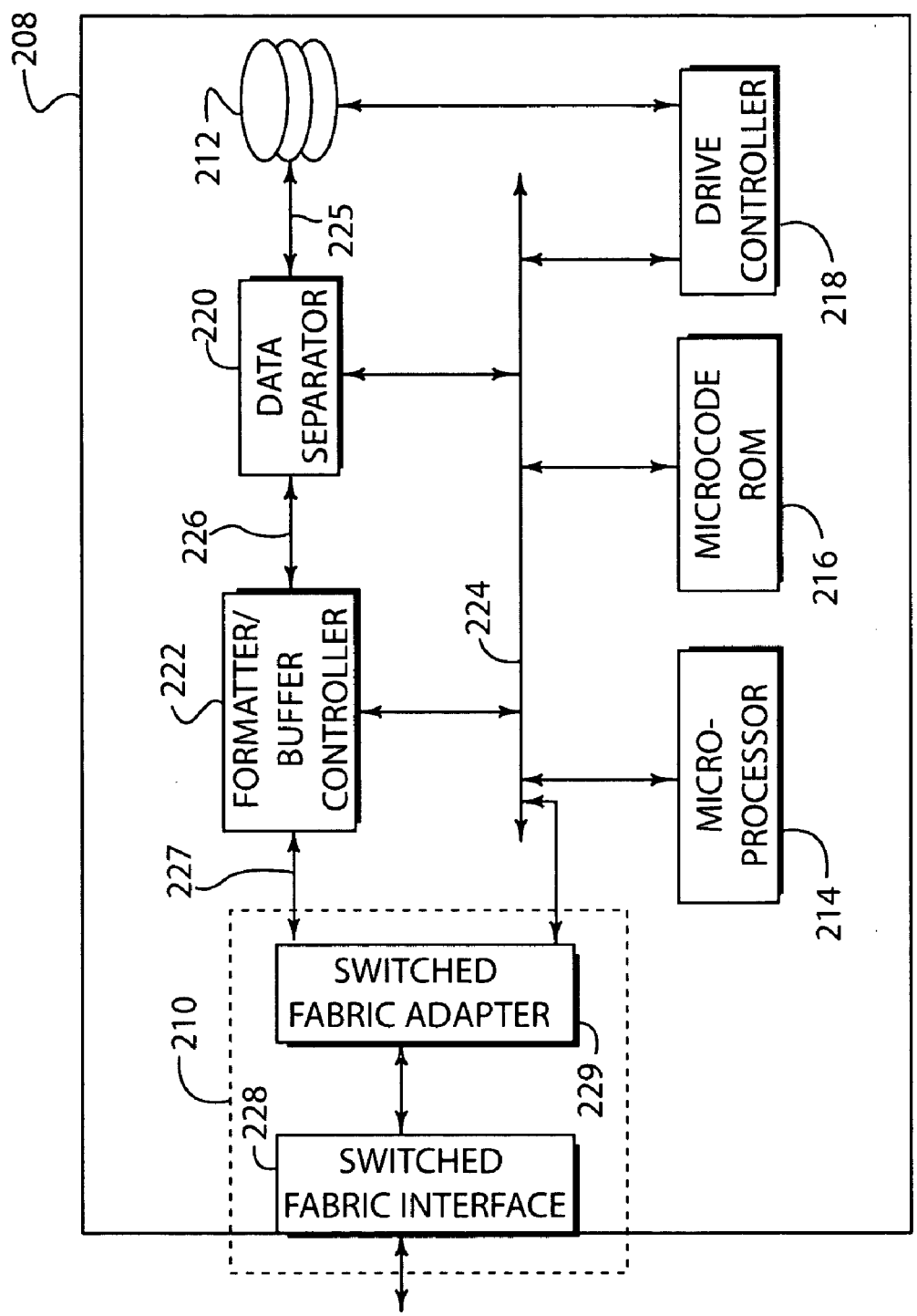
FIG. 6 is a block diagram of a storage device interface to the switched fabric networks shown in FIGS. 2, 3 and 4.

An exemplary storage device 208, such as a hard disk drive, as shown in a block diagram in FIG. 6, connects to the switched fabric 102 (FIG. 2) as one of the storage devices 106 (FIG. 2). Thus, the storage device 208 includes a fabric/drive interface 210, as well as conventional mass storage disks 212, a conventional microprocessor 214, a conventional microcode ROM 216, a conventional drive controller 218, a conventional data separator 220, a conventional formatter/buffer controller 222 and a conventional internal bus 224. The microprocessor 214 accesses and controls each of the other components of the storage device 208 through the internal bus 224. The microcode ROM 216 stores instructions to be executed by the microprocessor 214 to control the functions of the storage device 208. Thus, the microcode ROM 216 includes driver software for interfacing with the switched fabric 102 (FIG. 2). The drive controller 218 controls the electrical and mechanical aspects of actually reading and writing data from and to the disks 212, which store the data. The data separator 220 receives raw encoded data from the disks 212 at 225 and separates it into serial synchronous binary data, which is sent at 226 to the formatter/buffer controller 222. Additionally, the data separator 220 receives serial binary data from the formatter/buffer controller 222 at 226 and encodes it for magnetic storage on the disks 212. The formatter/buffer controller 222 formats the serial binary data into parallel data and buffers a sector of data for transfer at 227 through the fabric/drive interface 210. Additionally, the formatter/buffer controller 222 buffers a sector of data received at 227 from the fabric/drive interface 210 and formats it into serial binary data for transfer at 226 to the data separator 220.

The fabric/drive interface 210 generally includes a switched fabric interface 228 and a switched fabric adapter 229. The switched fabric interface 228 is connected to the switched fabric adapter 229, which in turn is connected to the formatter/buffer controller 222. The switched fabric interface 228 and the switched fabric adapter 229 are suited for the type of switched fabric (e.g. InfiniBand or Fibre Channel) in which the storage device 208 is incorporated. The switched fabric interface 228 generally includes a physical connector (not shown) for connecting to a conventional backplane (not shown) for connecting to the switched fabric 102 (FIG. 2). The switched fabric adapter 229 includes interface electronics (not shown) for receiving the formatted parallel data from the formatter/buffer controller 222 and sending the formatted parallel data to the switched fabric interface 228 for transmission to the switched fabric 102. Likewise, the switched fabric interface 228 receives parallel from the switched fabric 102 and passes it to the switched fabric adapter 229.

Figure 7:
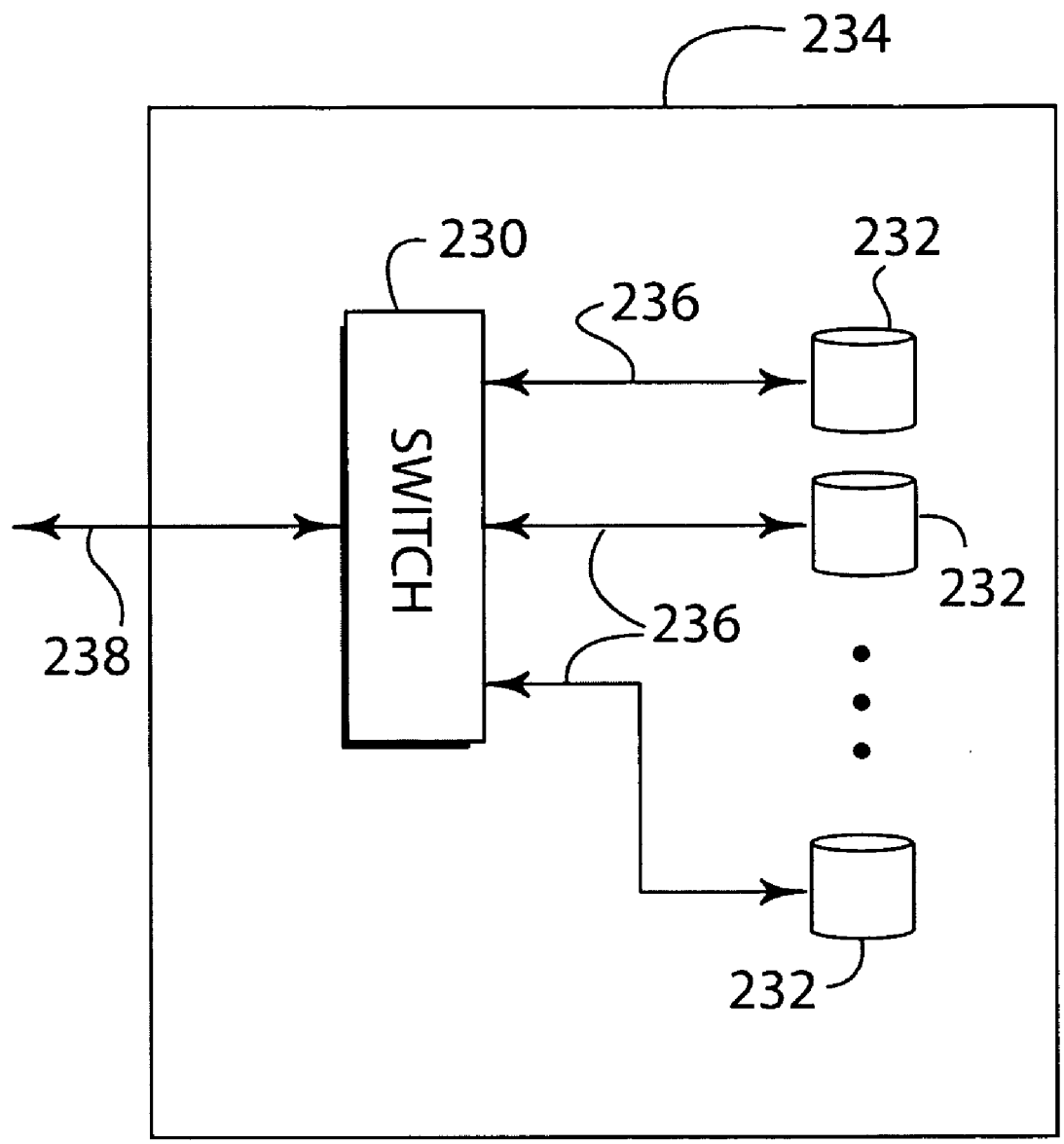
FIGS. 7, 8, 9, 10 and 11 are block diagrams of alternative configurations of switches and storage devices, or switched devices, incorporated in the switched fabric networks shown in FIGS. 2, 3 and 4.

In a first exemplary configuration, as shown in a block diagram in FIG. 7, a switch 230 and a plurality of storage devices 232 are connected in a switch/storage unit 234. The switch 230 is similar to the switch 188 (FIG. 5), and the storage devices 232 are similar to the storage device 208 (FIG. 6). Each storage device 232 is connected to the switch 230 by connection links 236. The switch 230 is connected to a host device 104 (FIG. 2) by a connection link 238. In this configuration, the connection link 238 and the connection links 236 have the same data transfer speed or bandwidth. As described above, this configuration does not optimize data transfer through each of the communication links 236 and 238. However, it is preferable to use this configuration in cost-sensitive, bandwidth-insensitive applications.

Figure 8:
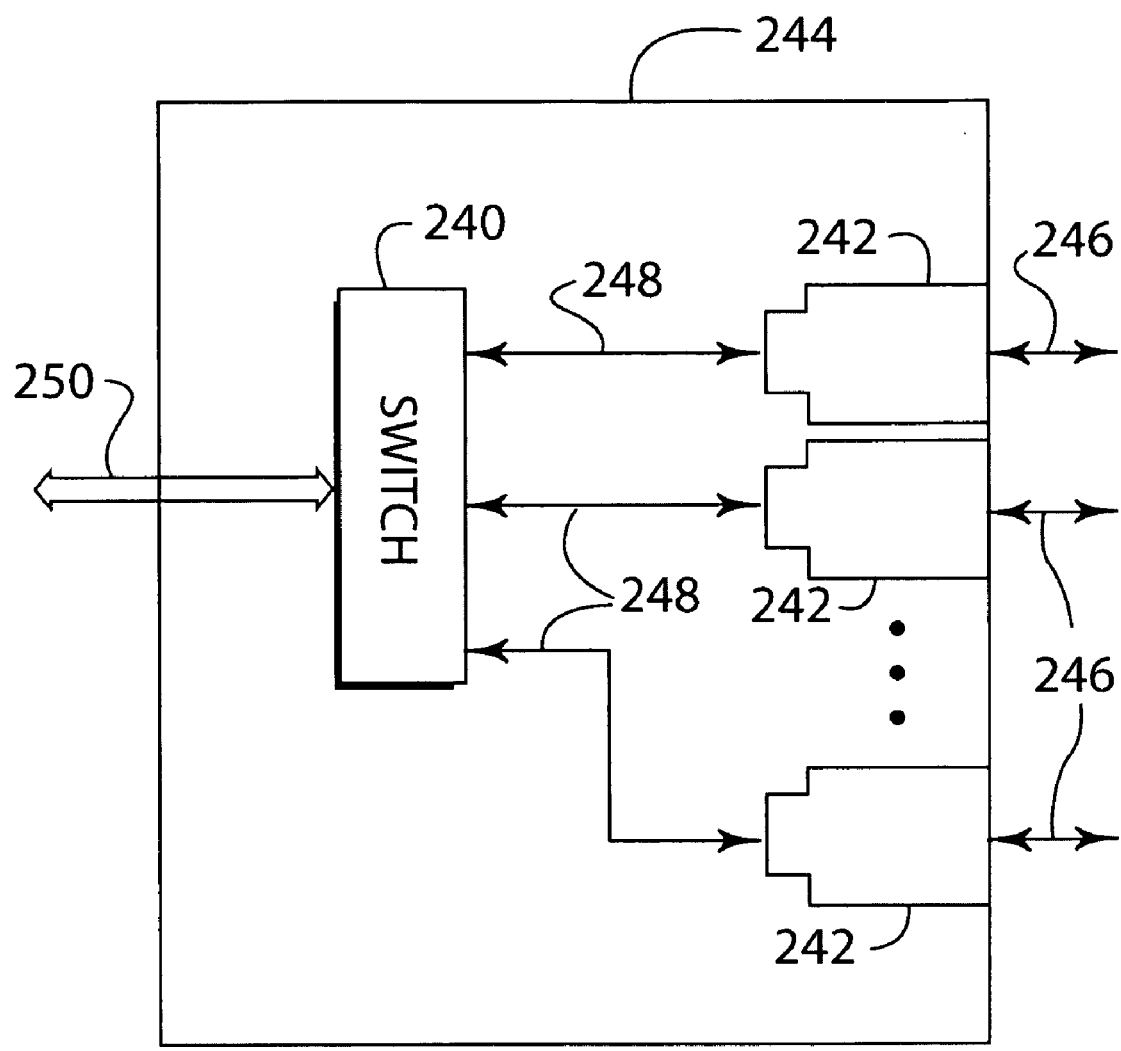

In a second exemplary configuration, as shown in a block diagram in FIG. 8, a switch 240 and a plurality of adapter slots 242 are connected in a switch/slot unit 244. The switch 240 is similar to the switch 188 (FIG. 5). The adapter slots 242 are preferably connections for conventional target channel adapters (TCAs), such as a SCSI (Small Computer System Interface) adapter, a Fibre Channel adapter, an Ethernet adapter or a T1 line adapter. Each of the adapter slots 242 connects through cables 246 to external devices (not shown), such as a SCSI device, a Fibre Channel device, an Ethernet network or a T1 link. Each of the adapter slots 242 connects to the switch 240 through communication links 248, and the switch 240 connects to a host device 104 (FIG. 2) or a switched fabric 102 (FIG. 2) through a communication link 250. The communication link 250 may have the same or a greater data transfer speed or bandwidth than the communication links 248, depending on the intended application for the adapter slots 242.

Figure 9:
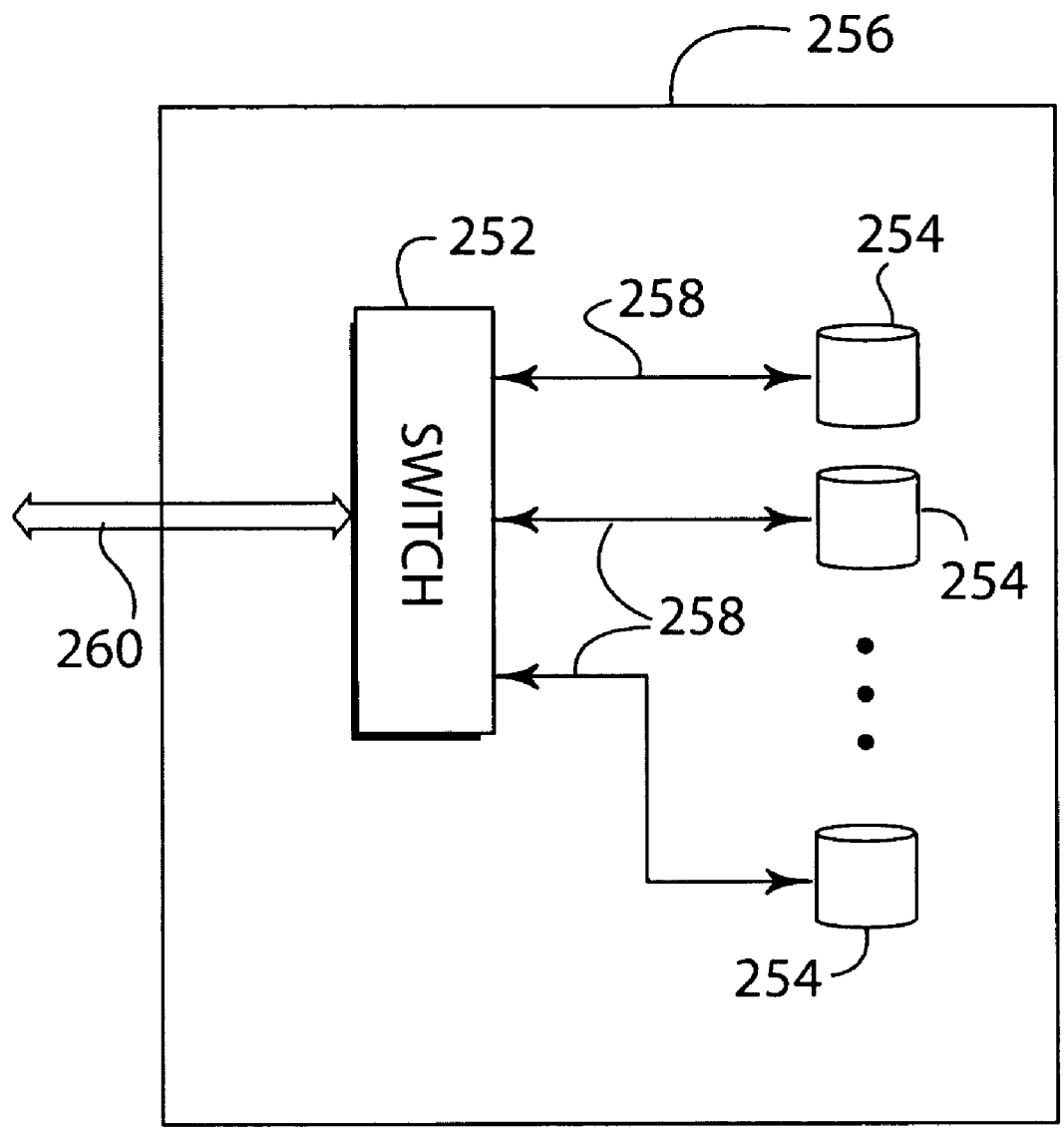

In a third exemplary configuration, as shown in a block diagram in FIG. 9, a switch 252 and a plurality of storage devices 254 are connected in a switch/storage unit 256. The switch 252 is similar to the switch 188 (FIG. 5), and the storage devices 254 are similar to the storage device 208 (FIG. 6). Each storage device 254 is connected to the switch 252 by connection links 258. The switch 252 is connected to a host device 104 (FIG. 2) by a connection link 260.

Since the storage devices 254 generally serve the storage needs of external clients or hosts, the storage devices 254 typically do not need to transfer data between themselves. Instead, the storage devices 254 only need to respond to data access requests from the host device 104 as the requests are received, which often results in two or more of the storage devices 254 responding at about the same time. To be able to handle the data transfer from two or more of the storage devices 254 at about the same time, the connection link 260 has a greater data transfer speed or bandwidth than the connection links 258. In fact, the data transfer bandwidth of the faster connection link 260 may be about the same as, or comparable to, the overall data transfer bandwidth of all of the slower connections links 258 combined. The bandwidth asymmetry between the greater bandwidth connection link 260 and the lesser bandwidth connection links 258 optimizes data transfer through each of the communication links 258 and 260, since each of the communication links 258 and 260 can be utilized to their full capacity. Additionally, the complexity of the switch 252 may be reduced due to the fact that the switch 252 does not have to establish a data transfer path between each of the storage devices 254.

Figure 10:
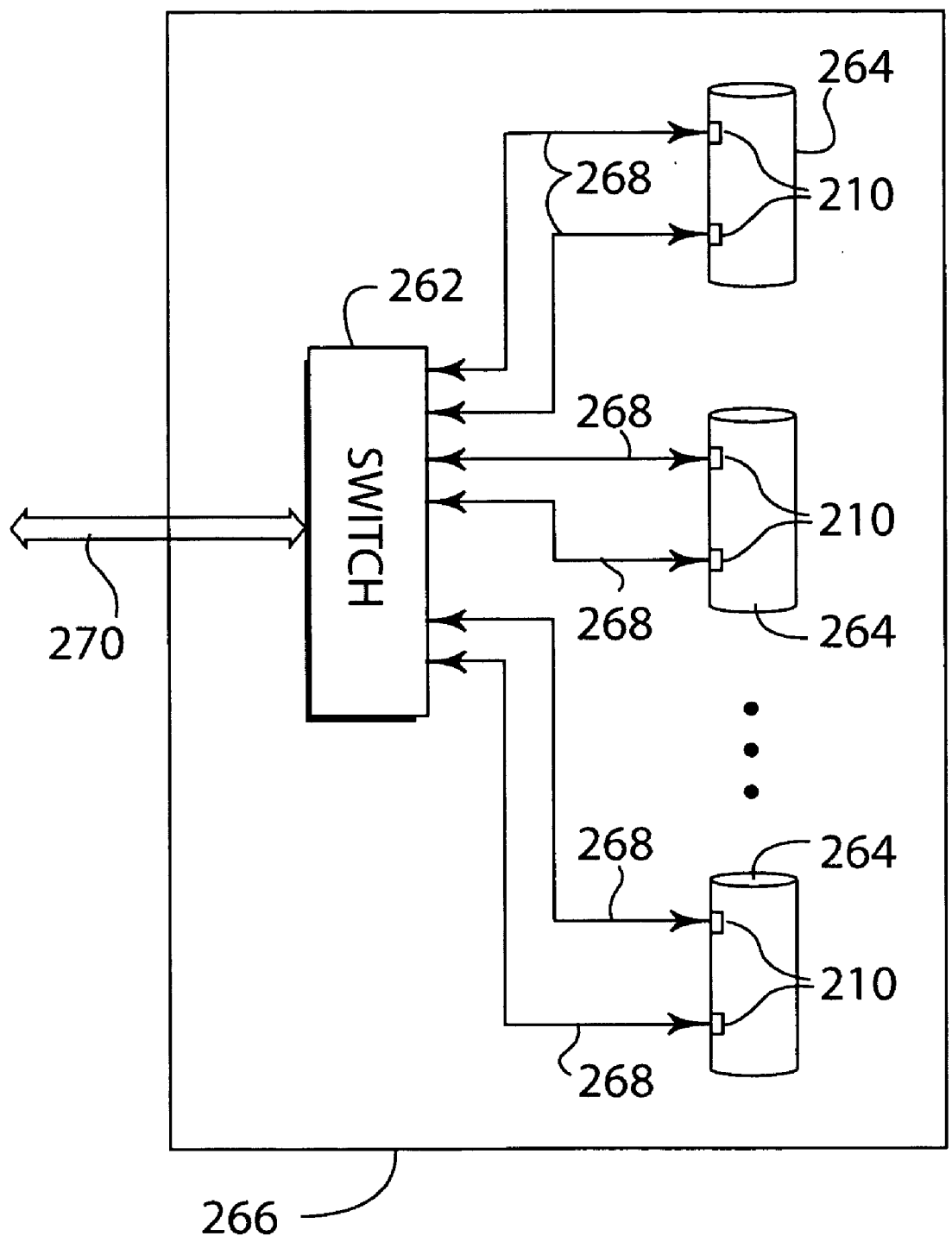

In a fourth exemplary configuration, as shown in a block diagram in FIG. 10, a switch 262 and a plurality of storage devices 264 are connected in a switch/storage unit 266. The switch 262 is similar to the switch 188 (FIG. 5), and the storage devices 264 are similar to the storage device 208 (FIG. 6), except that each storage device 264 has two fabric/drive interfaces 210 (also shown in FIG. 6). Such storage devices with two interfaces are known as dual port drives and can be accessed through either interface at the same time, either to access different data or the same data by each interface. When used to access the same data through both interfaces, the dual port drive enables redundant failover paths to the data. Each storage device 264 is connected to the switch 262 by two redundant connection links 268. In this manner, if one of the communication links 268 fails, then the other communication link 268 to the same storage device 264 handles the entire data transfer capabilities for the storage device 264. Thus, this configuration exploits the redundancy capabilities in dual port drives. The switch 262 is connected to a host device 104 (FIG. 2) by connection link 270. In this configuration, the connection link 270 has a greater data transfer speed or bandwidth than the connection links 268. Thus, as described with reference to the configuration shown in FIG. 9, the bandwidth asymmetry between the greater bandwidth connection link 270 and the lesser bandwidth connection links 268 optimize data transfer through each of the communication links 268 and 270.

Figure 11:
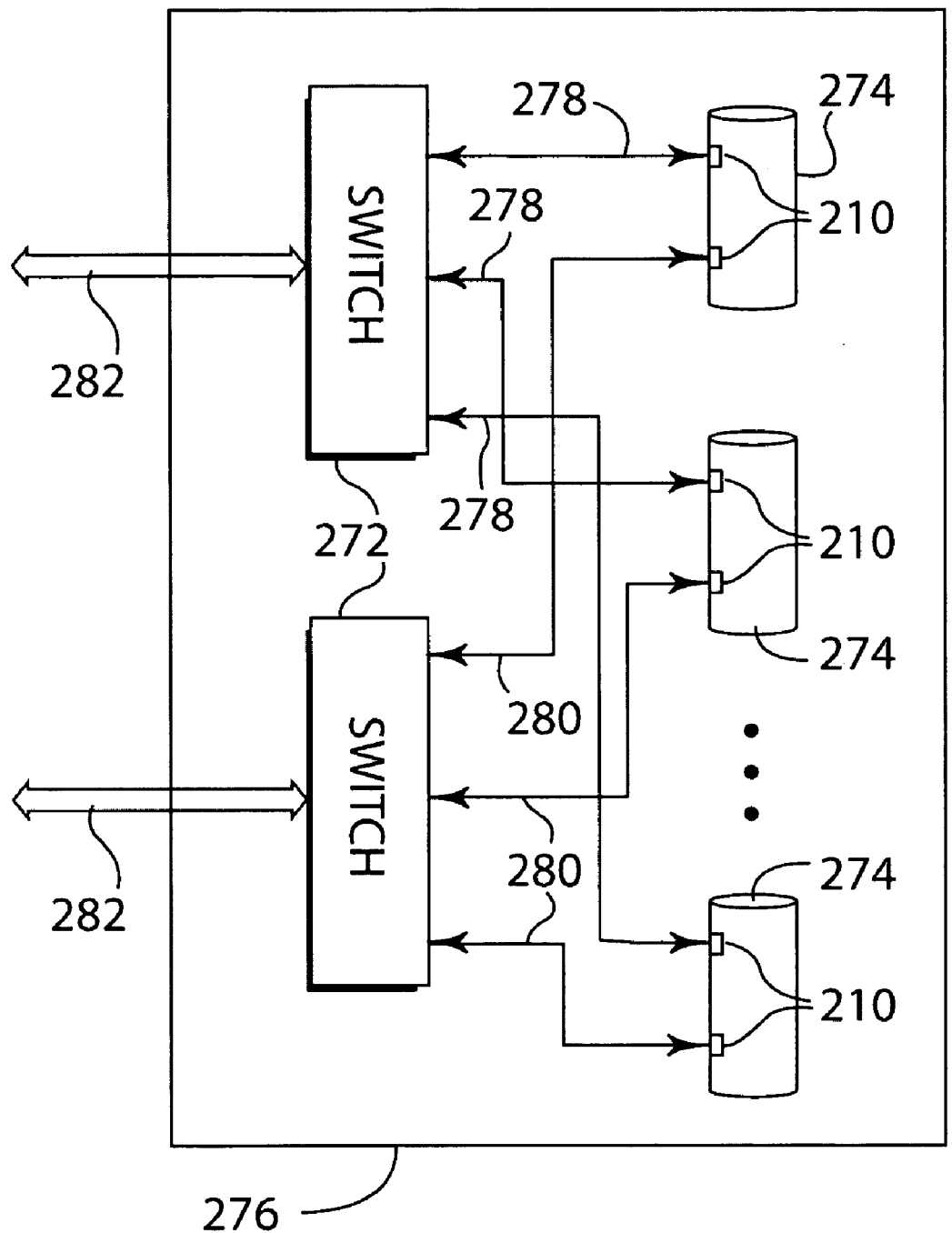

In a fifth exemplary configuration, as shown in a block diagram in FIG. 11, two switches 272 and a plurality of storage devices 274 are connected in a switch/storage unit 276. The switches 272 are similar to the switch 188 (FIG. 5), and the storage devices 274 are similar to the storage device 208 (FIG. 6), except that each storage device 274 has two fabric/drive interfaces 210 (also shown in FIG. 6). Thus, the storage devices 274 are dual port drives and can be accessed through either interface 210 at the same time, either to access different data or the same data. Each storage device 274 is connected to one of the switches 272 by connection links 278 and to the other switch 272 by connection links 280. In this manner, if one of the communication links 278 or 280 or one of the switches 272 fails, then the other switch 272 and the other communication link 278 or 280 to the same storage device 274 handle the entire data transfer capabilities for the storage device 274. Thus, this configuration exploits the redundancy capabilities in dual port drives.

The switches 272 are connected to a host device 104 (FIG. 2) by separate connection links 282. Additionally, in this configuration, the connection links 282 have a greater data transfer speed or bandwidth than the connection links 278 and 280. Thus, as described above with reference to the configuration shown in FIG. 9, the bandwidth asymmetry between the greater bandwidth connection links 282 and the lesser bandwidth connection links 278 and 280 optimizes data transfer through each of the communication links 278, 280 and 282.

The invention has the advantage of scalability of each portion of the switched fabric network 100 (FIG. 2). In other words, depending on the requirements of the application within which the switched fabric network 100 is utilized, any number of host devices 104 (FIG. 2) may be connected to any number of switches 107 (FIG. 2) of the switched fabric 102 (FIG. 2), which in turn may be connected to any number of storage devices 106 (FIG. 2). Therefore, each portion (host devices 104, switches 107, switched fabric 102 and storage devices 106) of the switched fabric network 100 may be monitored to determine which, if any, portion of the switched fabric network 100 is a limiting factor, or "bottleneck," in the overall efficiency or capacity of the switched fabric network 100. The portion that is the limiting factor is thus deemed to be "saturated." When a bottleneck, or "saturation condition," is detected for the host device 104, the switched fabric 102 or the storage devices 106, then that portion of the switched fabric network 100 may be upgraded or modified to have a greater capacity. The host device 104, the switch 107 or the storage devices 106 may be replaced with a device having a greater capacity, or an additional device may be added alongside the existing device to increase the overall capacity of that portion of the switched fabric network 100. The host device 104, or a system administrative device (not shown) connected to the switched fabric network 100, is operative to perform the monitoring and detecting.

For example, if the host device 104 is not capable of handling the full capacity of data transfers being directed to it (i.e. the host device 104 is saturated), then an additional host device 104 may be added to the switched fabric network 100. Alternatively, the existing host device 104 may be replaced by a different host device 104 having a greater capacity. In either alternative, the switched fabric network 100 is upgraded to a greater host device capacity.

Additionally, if the host-side link 198 (FIG. 5) to which the host device 104 is connected is saturated, then the host device 104 may be connected to two host-side links 198 of the same switch 188 (FIG. 5), or an additional switch 188 may be added alongside the existing switch 188 with the host device 104 connected to both, or the existing switch 188 may be replaced with a different switch 188 having faster host-side links 198. If a different switch 188 replaces the existing switch 188, it is preferable that the new switch 188 have storage-side links 200 (FIG. 5) that are the same as those of the replaced switch 188, so the storage devices 106 do not have to be upgraded or replaced. Likewise, if the storage-side links 200 of the switch 188 are saturated, then each of the storage devices 106 may be connected to two storage-side links 200 of the same switch 188, or an additional switch 188 may be added alongside the existing switch 188 with each of the storage devices 106 connected to both, or the existing switch 188 may be replaced with a different switch 188 having faster storage-side links 200.

Furthermore, if the transfer capacities of the storage devices 106 are saturated, even though the storage-side links 200 of the switch 188 can handle a higher capacity, then additional storage devices 106 may be added to the switched fabric network 100. Alternatively, the existing storage devices 106 may be replaced with new storage devices 106 with faster data transfer speeds, but which connect to the existing storage-side links 200, so the switch 188 does not have to be upgraded.

The invention also includes the cost and size advantages of a "system on a chip." In other words, by integrating each of the components described as part of the switch 188 in FIG. 5 into a single integrated circuit, the cost of a switched fabric architecture for connecting storage devices in a storage area network 112 (FIG. 3) or in a data processing device 152 (FIG. 4) is about the same as a shared bus architecture for connecting storage devices. Additionally, the invention exploits the data transfer speed and bandwidth advantages of independent switched channels in a switched fabric, thereby avoiding latency problems associated with a shared bus. The data transfer speed and bandwidth advantages are optimized with an "edge switch" implementation of the switches, wherein the host-side communication links have a greater data transfer speed or bandwidth than the storage-side communication links. Additionally, the switched fabric architecture can be simplified due to the fact that communication channels do not have to be established between the storage-side communication links.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A storage network for accessing stored data in a plurality of storage devices and storing data in said plurality of storage devices comprising:
   a first host device;
   a first host-side link that is connected to said first host device and not any other host devices, said first host-side link including a first host-side interface that sends and receives data to and from said first host device;
   a plurality of first storage-side links connected directly to said plurality of storage devices without going through a router, said plurality of first storage-side links including a plurality of first storage-side interfaces that send and receive data directly to and from said plurality of storage devices without going through a router;
   a first switch matrix that is connected to said first host-side link and not any other host-side links, and to said plurality of first storage-side links that is operative to establish communication channels between said first host-side link and any of said plurality of first storage-side links, but not establishing any communication channels between any of said plurality of first storage-side links;
   a second host device;
   a second host-side link that is connected to said second host device and not said first host device, said second host-side link including a second host-side interface that sends and receives data to and from said first host device;
   a plurality of second storage side links connected directly to said plurality of storage devices without going through a router, said plurality of second storage-side links including a plurality of second storage-side interfaces that send and receive data directly to and from said plurality of storage devices without going through a router;
   a second switch matrix that is connected to said second host-side link and to said plurality of second storage-side links that is operative to establish communication channels between said second host-side link and any of said plurality of second storage-side links, but not establishing any communication channels between any of said plurality of storage-side links.

2. A method of communicating data between two host devices and a plurality of storage devices comprising the process of:
   sending a first data access request from a first host device through a first host-side link to a first switch matrix, said first host-side link including a first host-side interface that sends and receives data to and from said first host-side device and not any other host-side devices;
   providing a plurality of first storage-side links connected directly to said plurality of storage devices without going through a router, said plurality of first storage-side links including a plurality of first storage-side interfaces that send and receive data directly to and from said plurality of storage devices without going through a router;
   establishing first data transfer paths between said first host device and said plurality of storage devices using a first switch matrix that is connected to said first host-side link and to said plurality of first storage-side links to create communication channels between said first host device and said plurality of storage devices without creating any communication channels between said plurality of storage devices;
   sending a second data access request from a second host device through a second host-side link to a second switch matrix, said second host-side link including a second host-side interface that sends and receives data to and from said second host-side device and is not connected to said first host-side device;
   providing a plurality of second storage-side links connected directly to said plurality of storage devices without going through a router, said plurality of second storage-side links including a plurality of second storage-side interfaces that send and receive data directly to and from said plurality of storage devices without going through a router;
   establishing second data transfer paths between said second host device and said plurality of storage devices using a second switch matrix that is connected to said second host-side link and to said plurality of second storage-side links to create communication channels between said second host device and said plurality of storage devices without creating any communication channels between said plurality of storage devices.

* * * * *